United States Patent [19]

Hashimoto et al.

[11] Patent Number: 4,841,891

[45] Date of Patent: Jun. 27, 1989

[54] DATA PROCESSING DEVICE AND METHOD FOR A SEWING MACHINE

[75] Inventors: Miho Hashimoto, Fujisawa; Masaaki Yokoe, Nagoya; Yoshikazu Kurono, Hazu; Koji Hayashi, Nagoya, all of Japan

[73] Assignee: Brother Kogyo Kabushiki Kaisha, Japan

[21] Appl. No.: 115,058

[22] Filed: Oct. 30, 1987

[30] Foreign Application Priority Data

Nov. 13, 1986 [JP] Japan ................................ 61-270613

[51] Int. Cl.$^4$ ............................................. D05B 21/00
[52] U.S. Cl. ........................... 112/262.3; 112/121.12; 112/103
[58] Field of Search .................. 112/121.12, 103, 445, 112/266.1, 262.3, 102, 78, 98, 456

[56] References Cited

U.S. PATENT DOCUMENTS

| | | | |
|---|---|---|---|
| 4,237,803 | 12/1980 | Nakanishi et al. | 112/457 |
| 4,352,334 | 10/1982 | Childs et al. | 112/103 X |
| 4,413,574 | 11/1983 | Hirota et al. | 112/121.12 |
| 4,446,520 | 5/1984 | Shigeta et al. | 112/121.12 |
| 4,498,403 | 2/1985 | Yanagi et al. | 112/121.12 |
| 4,520,745 | 6/1985 | Shinomiya et al. | 112/103 X |
| 4,622,907 | 11/1986 | Kimura | 112/121.12 |
| 4,704,977 | 11/1987 | Nukushina | 112/121.12 X |

*Primary Examiner*—Peter Nerbun
*Attorney, Agent, or Firm*—Parkhurst, Oliff & Berridge

[57] ABSTRACT

A data processing device for a sewing machine stores basic pattern data indicating the relative position between a needle and a material holding unit and including X and Y components of an X-Y coordinate. After setting a reference point on the X-Y coordinate plane and two angles ($\alpha i$, $\beta i$) based on an X-axis and a Y-axis around the reference point, the data processing device rotates the X and Y components of the basic pattern data on the basis of the two angles ($\alpha i$, $\beta i$) to form a transformed pattern, and stores the transformed pattern data. The processes such as rotation, inversion and inclination are executed by a single operation by designating the angles ($\alpha i$, $\beta i$).

15 Claims, 10 Drawing Sheets

IN THE CASE OF α=0, β=180
BEFORE ROTATION   Q=(20,10)
AFTER ROTATION    Q'=(20,30)

Fig. 11

DATA PROCESSING DEVICE AND METHOD FOR A SEWING MACHINE

BACKGROUND OF THE INVENTION

1. Field of the Invention

The present invention relates to a data processing device for a sewing machine for preparing stitch pattern data. In particular, the present invention relates to a data processing device for a sewing machine having a needle, material holding means, and a driving device for positioning the material holding means relative to the needle, and for forming a stitch pattern on the material by relative movement between the needle and the material holding means in accordance with stitch pattern data constructed as a data group of 2-dimensional coordinates.

2. Prior Art

Figure 4A:
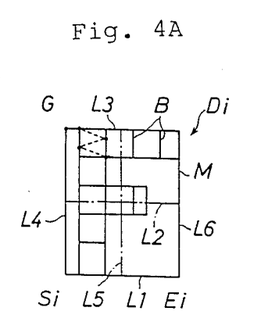
FIG. 4A illustrates a basic stitch pattern.
Figure 4B:
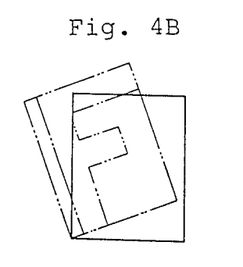
FIGS. 4B-4F illustrate stitch patterns which have been rotated, inverted or inclined.
Figure 4C:
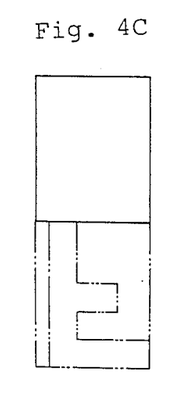
Figure 4D:
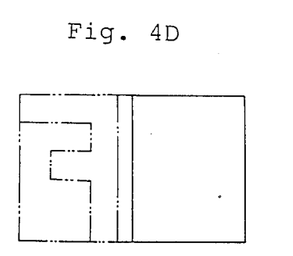
Figure 4E:
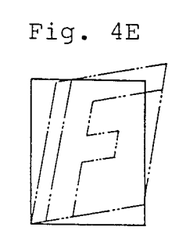
Figure 4F:
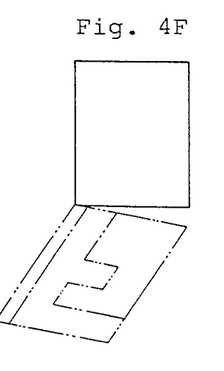
Figure 5A:
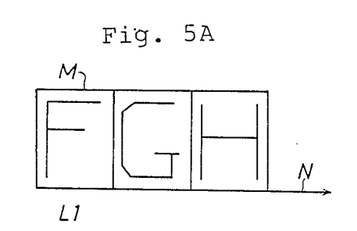
FIGS. 5A-5D illustrate arrangement examples of the basic pattern.
Figure 5B:
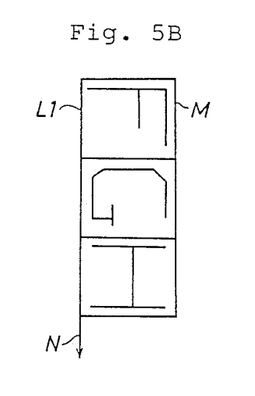
Figure 5C:
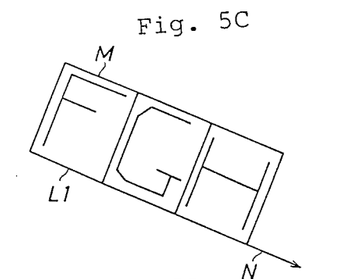
Figure 5D:
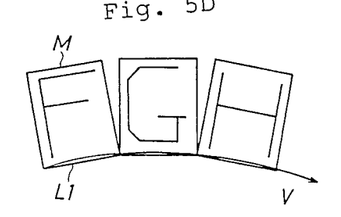

Prior to the present invention, such kind of data processing devices are installed apart from the aforementioned sewing machine or integrated therewith. The data processing devices disclosed in U.S. Pat. Nos. 4,413,574, 4,352,334, 4,622,907 and 4,237,803 are well-known. All of them have a basic pattern data memory which previously stores a plurality of basic stitch pattern data for forming a basic stitch pattern, letter symbols, etc. such as ones shown in FIG. 4A. It is generally well-known that desired basic pattern data selected from the basic pattern data memory must be modified through the processes such as inversion as shown in FIGS. 4C and 4D, rotation as shown in FIG. 4B and inclination as shown in FIG. 4E in order to form a desired stitch pattern. Accordingly, the conventional data processing devices include designation switches for each of the above processes. An operator operates the designation switches to prepare the stitch data for forming the desired stitch pattern. However, these conventional devices have some disadvantages. For example, in order to transform a basic stitch pattern shown in FIG. 4A into a desired stitch pattern shown in FIG. 4F, the inclination process shown in FIG. 4E is required after the inversion process shown in FIG. 4C. Therefore, it takes much time to process the data due to complicated operations of the designation switches.

SUMMARY OF THE INVENTION

An object of the present invention is to provide a data processing device for a sewing machine which can easily, accurately and rapidly execute data processes such as rotation, inversion, and inclination by a single operating and calculating process.

Another object of the present invention is to provide a data processing device for a sewing machine which can improve operability and processing ability.

In accordance with the present invention, a data processing device for a sewing machine having stitch forming means, material holding means and driving means for effecting the relative movement between the stitch forming means and the material holding means based upon processed pattern data, the data processing device comprises; first storage means for storing a basic pattern data indicating the relative position between the stitch forming means and the material holding means, the basic pattern data including X and Y components of an X-Y coordinate; first setting means for setting a reference point on the X-Y coordinate plane; second setting means for setting two angles ($\alpha i$, $\beta i$) based on an X-axis and a y-axis around the reference point; transforming means for rotating the X and Y components of the basic pattern data on the basis of the two angles ($\alpha i$, $\beta i$) to form a transformed pattern; and second storage means for storing the transformed basic pattern data.

In view of the above, if the predetermined point and rotation angle for a basic pattern data consisting of a data group of 2-dimensional coordinates are set in advance, the basic pattern data is transformed into a new data group of the 2-dimensional coordinates by the transforming means.

BRIEF DESCRIPTION OF THE DRAWINGS

Other objects and features of the invention will become apparent to those skilled in the art as the disclosure is made in the following description of a preferred embodiment of the invention, as illustrated in the accompanying sheet of drawings, in which.

DETAILED DESCRIPTION OF THE PREFERRED EMBODIMENT

Hereinafter, a preferred embodiment of the present invention will be described in detail referring to the accompanying drawings.

Figure 2:
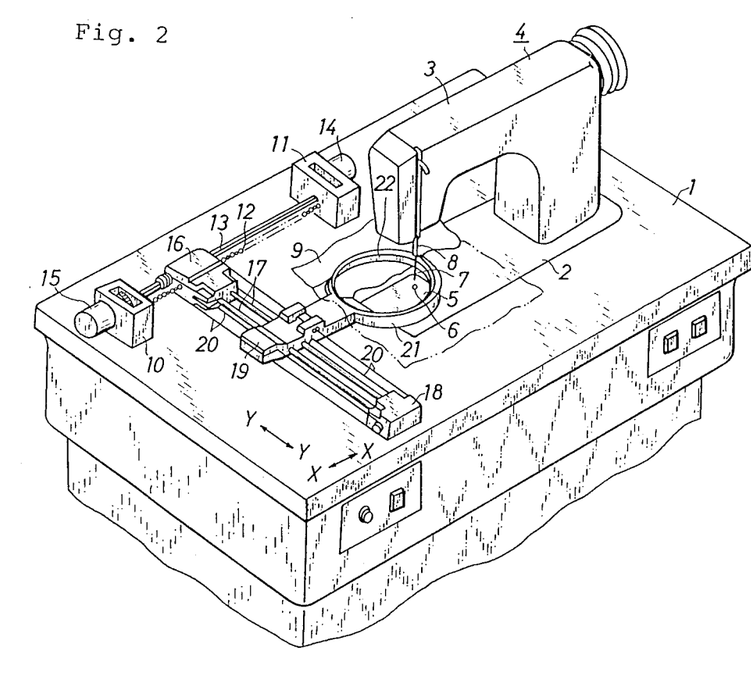
FIG. 2 is a perspective view of a sewing machine.

As shown in FIG. 2, a body 4 of a sewing machine including a bed 2 and an arm 3 is placed on a table 1. A needle plate 5, which has an aperture 6 substantially in the center thereof, is arrangd on the bed 2. A needle bar 8 having a needle 7 is movably supported at the arm 3 to allow a vertical movement passing through the aperture 6. A stitch pattern is formed on a fabric 9 by cooperation of the needle 7 on the needle bar 8 moving vertically in accordance with rotation of a main shaft (not shown) in the body 4, with a loop taker(not shown) inside the bed 2.

A pair of frames 10 and 11 are fixed left and right on the back side of the table 1 at a predetermined interval, and a feed screw 12 and a rotational transmission shaft 13 are installed therebetween to allow rotation. The right frame 11 includes an X-axis pulse motor 14 for rotating the feed screw 12 via a gear mechanism(not shown), and the left frame 10 includes a Y-axis pulse motor 15 for rotating the rotational transmission shaft 13.

An X-axis carriage 16 moving along the X-axis is supported on the feed screw 12 and the shaft 13, and has guide pipes 17 which extend in the direction intersecting, at right angles, both the feed screw 12 and the rotational transmission shaft 13. A supporter 18 is installed at the end of the guide pipes 17. A Y-axis carriage 19 moving along the Y-axis is supported on the guide pipes 17. One end of a pair of connecting wires 20 connected with the rotational transmission shaft 13 is fixed to the Y-axis carriage 19. Fabric holding means, which includes both a hoop 21 installed to the Y-axis carriage 19 and an inner hoop 22, holds the fabric 9 therebetween. Therefore, the hoop 21 is respectively moved: along the X-axis via the feed screw 12 and the X-axis movable carriage 16 in accordance with rotation of the X-axis pulse motor 14; and along the Y-axis laying at right angles to the X-axis via the rotational transmission shaft 13, the connecting wires 20, and the Y-axis movable carriage 19 in accordance with rotation of the Y-axis pulse motor 15.

Figure 3:
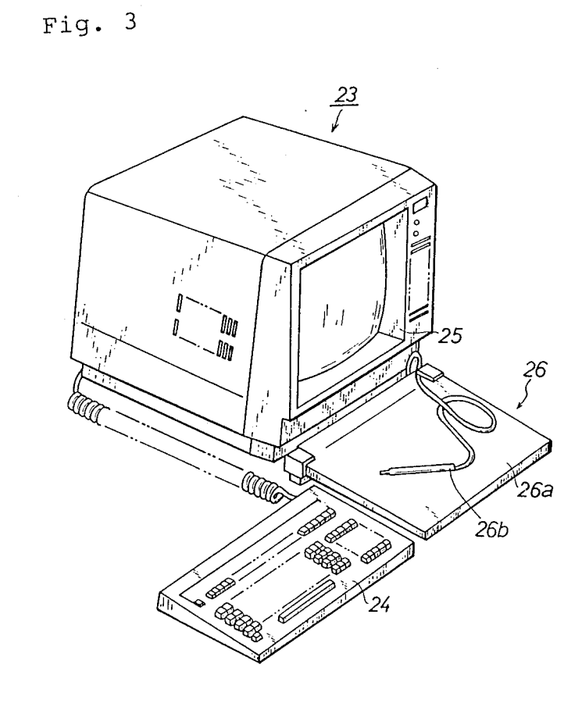
FIG. 3 is a perspective view of the data processing device.

A data processor 23 shown in FIG. 3 is attached to the sewing machine in this embodiment. The data processor 23 including a keyboard 24, a display unit 25 and a digitizer 26 prepares data to form a desired stitch pattern on the fabric 9. The digitizer 26 which includes a tablet board 26a and a stylus 26b outputs coordinate data of a point designated by the stylus 26b to a central processing unit (CPU) 31. A mouse(not shown) may be applied instead of the digitizer 26. In addition, the keyboard 24 is used for selection of basic pattern data and for input of angles ($\alpha i$, $\beta i$), which will be treated later.

Figure 1:
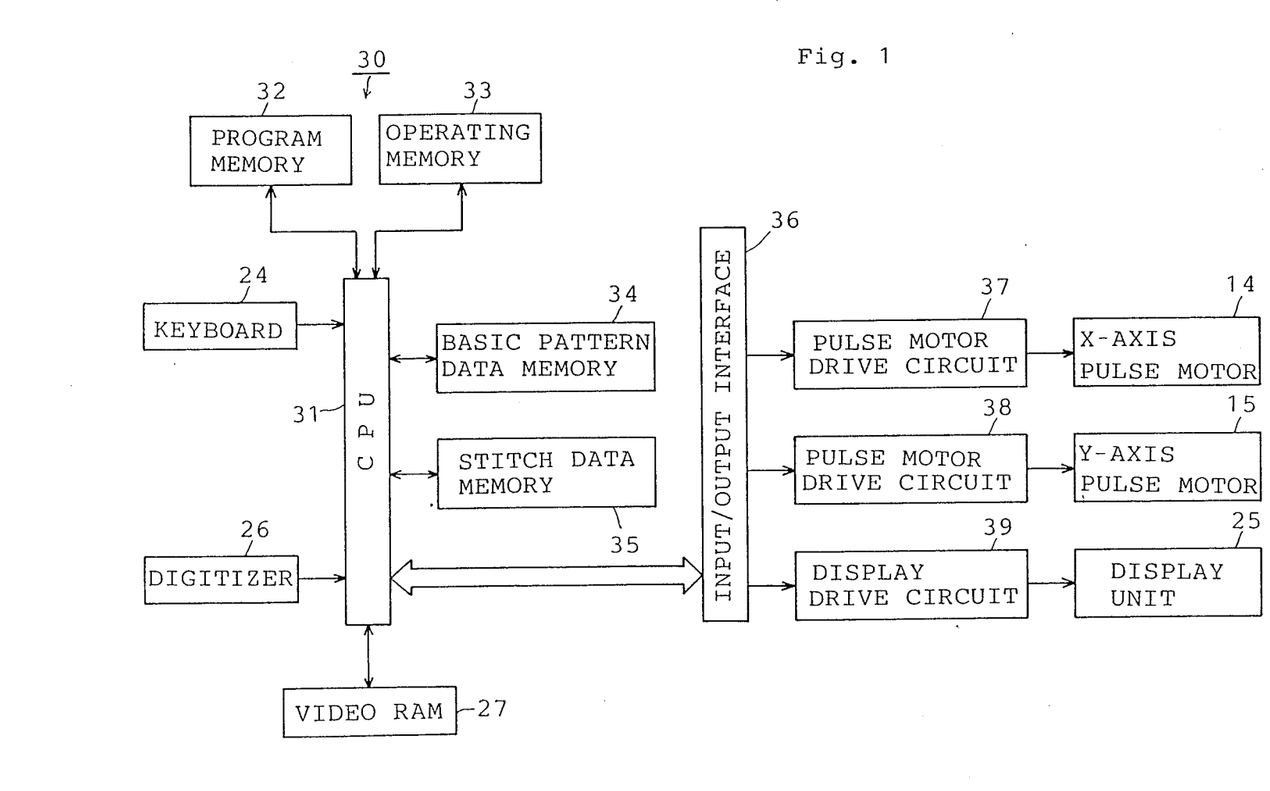
FIG. 1 is a block diagram showing an electronic system of a data processing device.

Referring now to FIG. 1, an electronic system of the data processor 23 will be explained. A microcomputer 30 for transforming means includes the CPU 31 which prepares data corresponding to a desired stitch pattern, a program memory 32 which has a read only memory(-ROM) storing a control program, and an operating memory 33 which has a random access memory(RAM) temporarily storing the calculated result of the CPU 31.

The keyboard 24 and the digitizer 26 are connected to the CPU 31, which receives both an input signal in accordance with key operation of the keyboard 24 and a coordinate reading signal in accordance with operation of the digitizer 26. A basic pattern data memory 34 including a ROM, a floppy disk and so on is also connected to the CPU 31.

A basic pattern data means a group of data representative of each basic stitch pattern. As shown in FIG. 4A, for example, the basic pattern data includes: an origin G of a predetermined character pattern data; stitch blocks B, each having a predetermined form (square or triangle) to divide a figure of the stitch pattern according to the character pattern; and a square mask M, having the origin G as one of its vertexes, as well as containing the whole character pattern. Each stitch block B includes a group of needle location data necessary for forming the character pattern, that is, a group of coordinate data for the two axes X and Y which intersect at right angles to each other. Further, the origin G is set by an X-Y coordinate and a group of the coordinate data are represented by increment values from the origin G. In other words, if the first needle location counted from the origin G is represented as ($X_1$, $Y_1$), the next needle location ($X_2$, $Y_2$) is represented as ($X_1 + \Delta hd x$, $Y_1 + \Delta_y$).

In this embodiment, as shown in FIG. 4A, different kinds of reference lines L1–L6 are set to arrange many basic patterns in the different directions. L1 and L3 are lines extending horizontally along the border of the mask M, and L2 is a line extending parallel to the reference lines L1 and L3 through the center of the mask M. In addition, L4 and L6 are lines extending vertically along the border of the mask M, and L5 is a line extending parallel to the reference lines L4 and L6 through the center of the mask M. When many basic patterns are arranged, they can be arranged along a straight line N or a curved line V by adopting the reference line L1 as shown in FIGS. 5A–5D. A detailed explanation about the basic pattern data and arrangement of the basic patterns will be omitted because it has been disclosed in U.S. Pat. No. 4,413,574.

A stitch data memory 35 includes a RAM and is connected to the CPU 31. When a basic pattern data is rotationally transformed accompanying to the key operation on the keyboard 24, the stitch data memory 35 temporarily stores a new pattern data. Subsequently, the CPU 31 outputs a drive control signal to both a pulse motor drive circuit 37 and a pulse motor drive circuit 38 via an input/output interface 36 according to the new pattern data to respectively control the X-axis pulse motor 14 and the Y-axis pulse motor 15. Moreover, the CPU 31 outputs a display control signal to a display drive circuit 39 via the input/output interface 36 to control the display unit 25.

Figure 11:
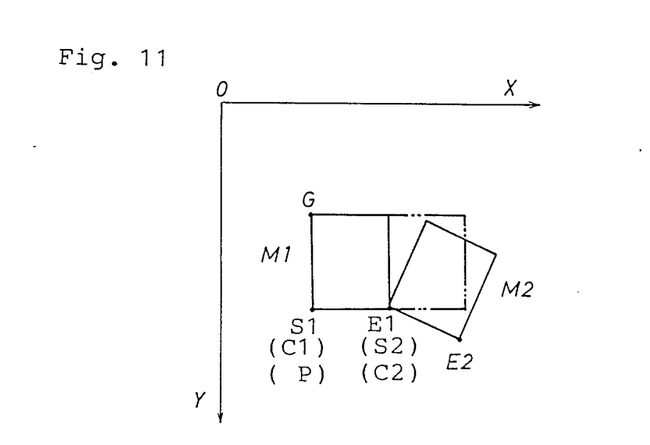
FIG. 11 illustrates a rotation process of the basic pattern data.

The case in which each basic pattern is arranged horizontally on the basis of the reference line L1 of the mask M will be taken for an example to explain the operation of the data processor 23. Referring to the flowchart in FIG. 6, when a switch of the data processor 23 is turned on, a frame of area which designates a movable range of the hoop 21 is displayed on the display unit 25 at step 50. At step 51, the keyboard 24 or the digitizer 26 is operated to input a needle position P representative of a stitch start position. The CPU 31 not only displays the needle position P on the display unit 25 but executes an initialization process at step 52. In other words, as shown in FIG. 11, the stitch start position P is set not only as a start point S1 of a basic pattern data D1 to be input first but as a rotation center C1 thereof. Further, an X-axis rotation angle $\alpha 1$ and a Y-axis rotation angle $\beta 1$ are both set to 0. A basic pattern data, a mask, a start point and a rotation center of the basic pattern data are represented by general symbols, Di, Mi, Si and Ci(i=1, 2, 3, ...), respectively, and an end point is similarly represented by Ei(i=1, 2, 3, ...). Each data, that is, Mi, Si, Li, Ei, $\alpha i$ and $\beta i$, is stored in the operating memory 33.

Figure 6:
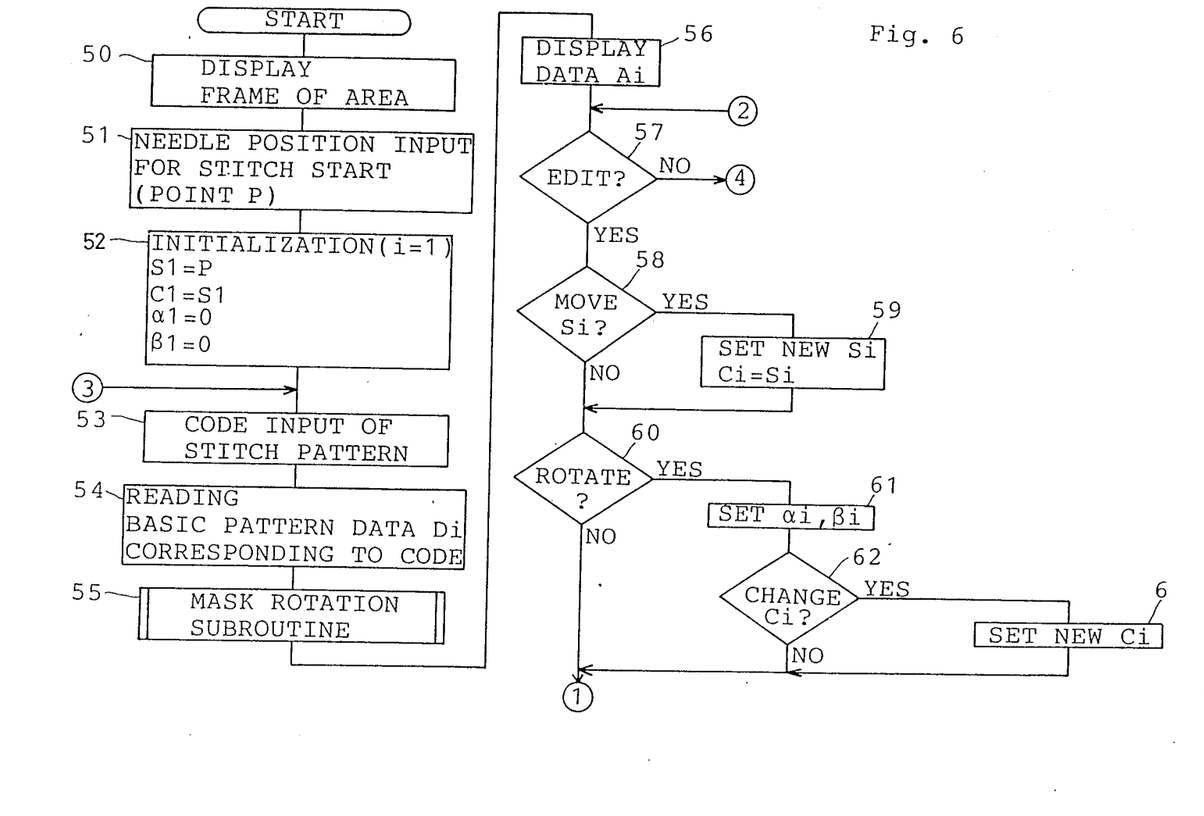
FIGS. 6 and 7 are flowcharts showing process steps for a desired stitch pattern in this embodiment of the present invention.

When a code data corresponding to a basic stitch pattern to be formed is input by the opertion of the keyboard 24 at step 53, the CPU 31 reads out a basic pattern data Di corresponding to the code from the basic pattern data memory 34 to temporarily store the data in the stitch data memory 35, as well as to temporarily store video data in a video RAM 27 for displaying the pattern at step 54. The process step proceeds to a mask rotation subroutine of step 55, where a mask Mi stored in the video RAM 27 and all the stitch block data B therein are rotationally transformed.

Figure 8:
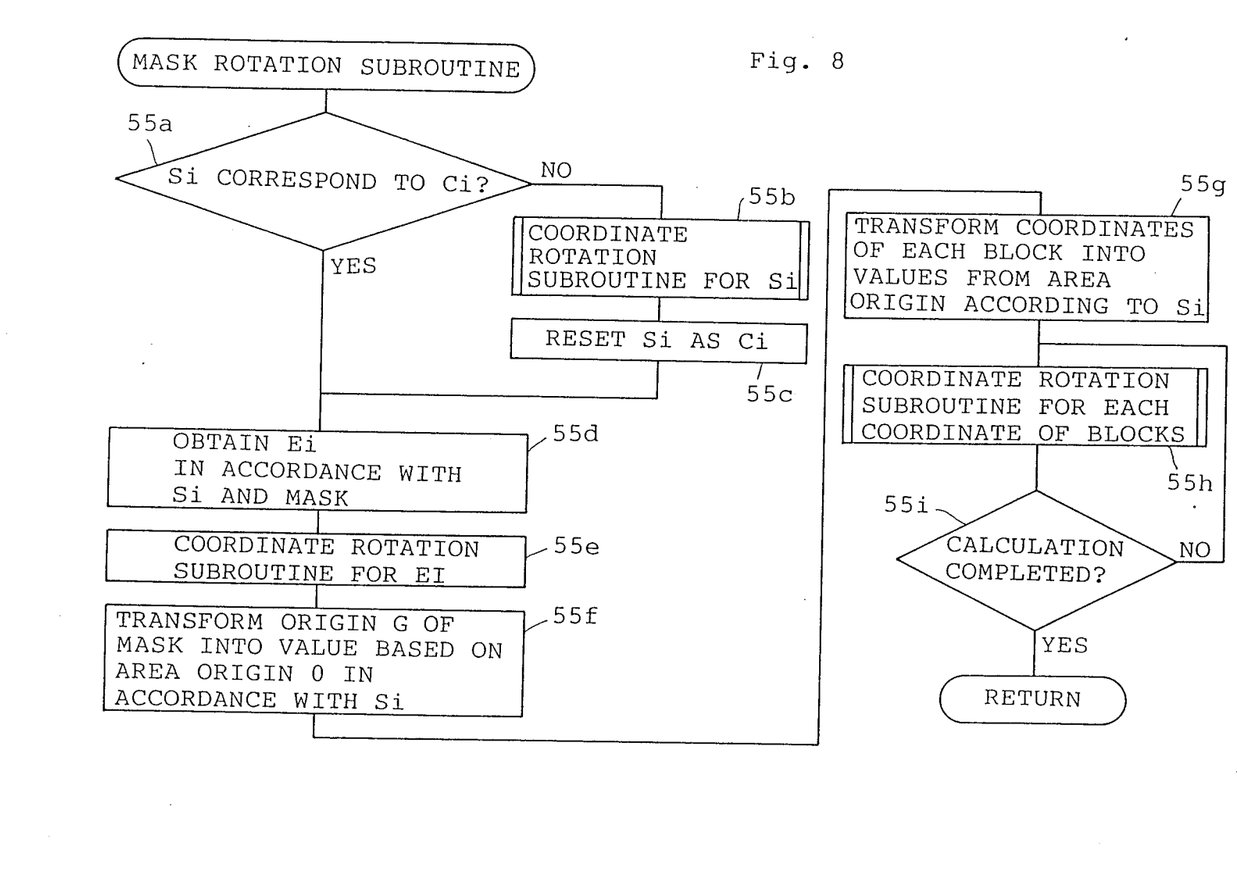
FIG. 8 is a flowchart showing a mask rotation subroutine.

Namely, as shown in FIG. 8, first of all, it is determined at step 55a whether the start point Si corresponds to the rotation center Ci. When the answer is NO, the process step proceeds to the next step 55b of a coordinate rotation subroutine to execute the predetermined rotation process for the start point Si around the rotation center Ci in accordance with X-axis rotation angle $\alpha i$ and the Y-axis rotation angle $\beta i$.

Figure 9:
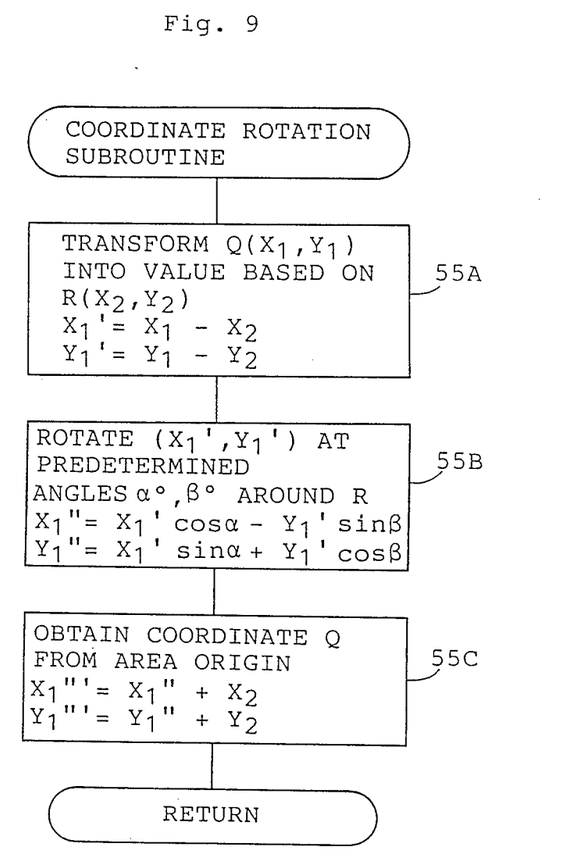
FIG. 9 is a flowchart showing a coordinate rotation subroutine.
Figure 10:
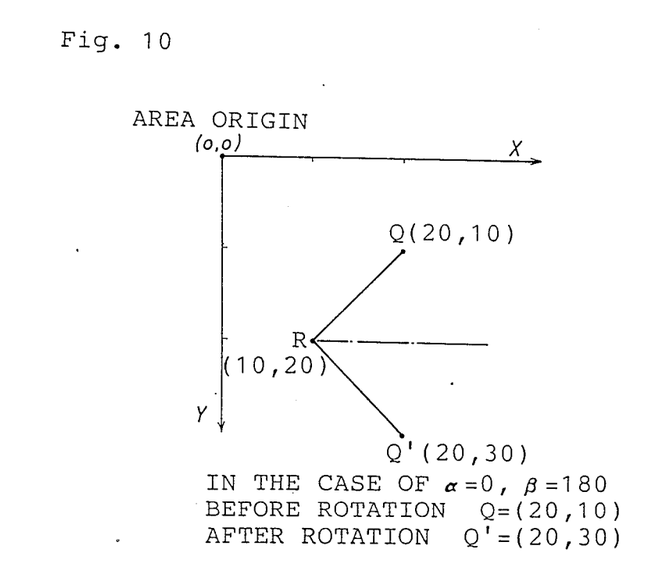
FIG. 10 illustrates a coordinate rotation process.

The coordinate rotation subroutine will be described referring to FIGS. 9 and 10. Of two points Q($X_1$, $Y_1$) and R($X_2$, $Y_2$) which are coordinates based on an area origin represented by the X-Y coordinate, X and Y components of the point Q are respectively rotated $\alpha^\circ$ and $\beta^\circ$ around the point R. At step 55A, the CPU 31 transforms the coordinate of the point Q into a coordinate value of $(X_1', Y_1')$ based on the point R as an origin according to the following equations.

$$X_1' = X_1 - X_2, \quad Y_1' = Y_1 - Y_2$$

where the rotation center Ci and the start point Si are equivalent to the points R and Q, respectively.

At the next step 55B, the coordinate value of $(X_1'', Y_1'')$ is calculated according to the following equations.

$$X_1'' = X_1' \cos \alpha - Y_1' \sin \beta$$

$$Y_1'' = X_1' \sin \alpha - Y_1' \cos \beta$$

Further, at step 55C, the coordinate of the point $Q'(X_1''', Y_1''')$ from the area origin 0 is calculated according to the following equations.

$$X_1''' = X_1'' + X_2, \quad Y_1''' = Y_1'' + Y_2$$

After all the processes of the coordinate rotation subroutine have been completed, the process step returns to step 55c in FIG. 8 for the mask rotation subroutine.

At step 55c, the start point Si before coordinate rotation is reset as a new rotation center Ci. After this process has been completed, or when the answer at the step 55a is YES, the process step proceeds to step 55d to obtain the end point Ei in accordance with the start point Si and the mask Mi before the rotation process. This end point Ei is set at an interval of a length of the X-axis component of the mask Mi from the start point Si along the X-axis.

At step 55e, the coordinate rotation subroutine process, that is, the rotation process for an end point Ei around the rotation center Ci, is executed to obtain the end point Ei after the rotation. At step 55f, the origin G of the mask Mi is transformed into the coordinate value based on the area origin 0 in accordance with the coordinate data of the start point Si. At step 55g, the coordinate data of each stitch block B inside the mask Mi, namely, the increment value data from the origin G of the mask Mi, are transformed into the coordinate value data from the area origin 0 in accordance with the coordinate data of the start point Si.

Further, the process step proceeds to step 55h where the coordinate data of each stitch block B is rotationally transformed around the rotation center Ci to obtain the coordinate data of each rotated stitch block B. This process is repeated until the answer at step 55i becomes YES and the coordinate data are stored in the video RAM 27. Thus, after all the mask rotation subroutine processes have been completed, the process step returns to step 56 of the main routine.

At the step 56, data Ai—that is, all the stitch blocks B inside the basic pattern which are rotationally transformed and stored in the video RAM 27—is displayed. However, while the X-axis rotation angle $\alpha 1$ and the Y-axis rotation angle $\beta 1$ remain 0, the stitch blocks B are displayed without rotation.

At step 57, it is determined whether an editorial process such as rotation, inversion and inclination for the basic pattern data is to be executed. When the answer is YES, the process step proceeds to step 58 where it is determined whether the start point Si has been moved, or relocated. When the answer is YES, namely, when a new start point Si is input from the keyboard 24 or the digitizer 26, the new value is stored as the rotation center Ci in the operating memory 33. When the answer at the step 58 is NO, or when the process at step 59 has been completed, the process step proceeds to step 60 where it is determined whether the basic pattern data Di is to be rotationally transformed. When the answer is YES, namely, when the X-axis rotation angle $\alpha i$ and the Y-axis rotation angle $\beta i$ are input from the keyboard 24 or the like, they are stored in the operating memory 33 at step 61.

Moreover, at step 62, it is determined whether the rotation center Ci has been changed, or relocated. When the answer is YES, namely, when a new rotation center Ci is input by operating the keyboard 24 or the like, the new value is stored in the operating memory 33 at step 63.

Figure 7:
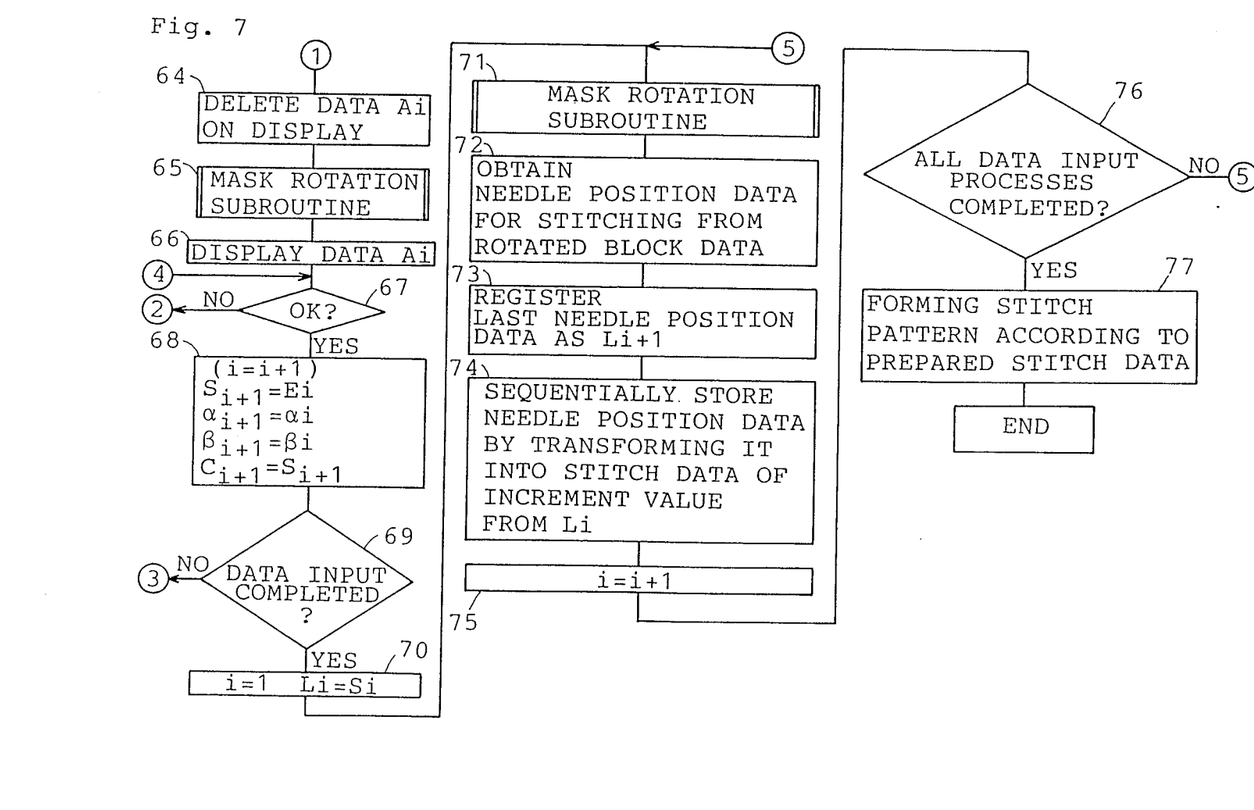

Subsequently, as shown in FIG. 7, at step 64, the data Ai displayed on the display unit 25 is deleted to execute again the process at step 65 in accordance with the mask rotation subroutine in FIG. 8. At this time, the mask Mi stored in the video RAM 27 is rotated again according to the data newly set in the steps 59, 61 and 63. At the next step 66, the data Ai is displayed according to the mask data after the rotation. If the displayed data is not approved by an operator, the answer at step 67 becomes NO, so that the process step returns to the step 57 to repeat the steps 57 to 66. If it is approved, the process step proceeds to step 68 where each data number of the basic pattern data is increased to become the basis for the next data process. In other words, the end point Ei is reset as a start point $S_{i+1}$, and the rotation angles $\alpha i$ and $\beta i$ as $\alpha_{i+1}$, $\beta_{i+1}$, respectively. Further, the start point $S_{i+1}$ is reset as the rotation center $C_{i+1}$.

At step 69, it is determined whether the basic pattern data input has been completed. If the answer is NO, the process step returns to the step 53 shown in FIG. 6 to repeat steps 53 to 68. At step 70, in order to rotationally transform the needle location data corresponding to each of the basic pattern data Di temporarily stored in the stitch data memory 35, the start point Si of the basic pattern data $Di(i=1)$ first input is set as a point Li which is a basis to obtain the increment value of the present basic pattern data. The point Li reepresents the present start point Si in the case of $i=1$, while it represents the last needle location of the previous data in the other cases. In the mask rotation subroutine at step 71, the coordinate data of each stitch block B of the first basic pattern data $Di(i=1)$ are rotationally transformed. Then, at step 72, the coordinate data of each needle location from the area origin 0 are prepared on the basis of the above result.

At step 73, the last needle location data obtained at step 72 are registered as a point $L_{i+1}$ which is a basis to obtain the increment value of the next basic pattern data. Next, the final stitch pattern data are prepared by transforming the coordinate data obtained at the step 72 into the increment values from the point Li to sequentially store them in the stitch data memory 35 at step 74.

At step 75, the data number of the basic pattern data Di is increased, and it is determined whether all the processes for the input basic pattern data have been comleted at step 76. The steps 71 to 75 are repeated until the answer is YES at step 76. When the answer is YES, the sewing machine is operated to form the stitch pattern on the fabric 9 at step 77.

In the aforementioned flowchart, if each of the rotation angles $\alpha$, $\beta$ is set as in the following table, the processes for preparing the data for inclination, rotation and inversion patterns as shown in FIGS. 4B–4F are simplified, thereby providing easy and accurate operation of the sewing machine.

TABLE

| FIG. No. | X axis rotation angle $\alpha$ | Y axis rotation angle $\beta$ |
|---|---|---|
| FIG. 4 (b) | 20° | 20° |
| (c) | 0° | 180° |
| (d) | 180° | 0° |
| (e) | 10° | −10° |
| (f) | −10° | 145° |

Obviously, many modifications and variations of the present invention are possible in the light of the above teachings. For example, the hoop 21 and the inner hoop 22 may be fixed at the predetermined position to move the needle 7 along the X-axis and Y-axis thereto. Further, a light pen may be used to input a reference commands for rotation. It is therefore to be understood that within the scope of the appended claims, the invention may be practiced otherwise than as specifically described.

What is claimed is:

1. A data processing device for a sewing machine having stitch forming means, material holding means and driving means for effecting the relative movement between said stitch forming means and said material holding means based upon processed pattern data, said data processing device comprising;
    first storage means for storing a basic pattern data indicating the relative position between said stitch forming means and said material holding means, said basic pattern data including X and Y components of an X-Y coordinate;
    first setting means for selecting a reference point on said X-Y coordinate plane;
    second setting means for selecting two predetermined angles ($\alpha i$, $\beta i$) respectively based on an X-axis and a Y-axis around said reference point;
    transforming means for rotating said X and Y components of said basic pattern data in accordance with said two predetermined angles ($\alpha i$, $\beta i$) to form a transformed pattern; and
    second storage means for storing said transformed basic pattern data.

2. A data processing device for a sewing machine according to claim 1, wherein said first setting means includes a CRT and a light pen.

3. A data processing device for a sewing machine according to claim 1, wherein said first setting means includes a CRT, a tablet board, and a stylus.

4. A data processing device for a sewing machine according to claim 1, wherein said first setting means includes a CRT and a keyboard.

5. A data processing device for a sewing machine having stitch forming means, material holding means, and driving means, for effecting the relative movement between said stitch forming means and material holding means based upon processed pattern data, said data processing device comprising;
    first storage means for storing a plurality of basic pattern data, each indicating the relative position between said stitch forming means and said material holding means, said basic pattern data including X and Y components of an X-Y coordinate;
    pattern selecting means for selecting a desired basic pattern from said first storage means;
    display means for displaying said selected pattern on a display member thereof;
    first designating means for designating a reference point on said display member;
    setting means for selecting two predetermined angles ($\alpha i$, $\beta i$) respectively based on an X-axis and a Y-axis around said reference point;
    transforming means for rotating said X and Y components of said selected basic pattern data in accordance with said two predetermined angles ($\alpha i$, $\beta i$) to form a transformed pattern; and
    second storage means for storing said transformed basic pattern data.

6. A data processing device for a sewing machine according to claim 5, wherein said designating means includes a keyboard.

7. A data processing device for a sewing machine according to claim 5, wherein said designating means includes a tablet board and a stylus.

8. A data processing device for a sewing machine according to claim 5, wherein said setting means includes a keyboard.

9. In a data processing device for a sewing machine having stitch forming means, material holding means and driving means for effecting the relative movement between said stitch forming means and said material holding means based upon processed pattern data, a method for preparing stitch data and performing sewing operations in a single operating and calculating process, comprising the steps of:
    storing a basic pattern data indicating the relative position between said stitch forming means and said material holding means, said basic pattern data including X and Y components of an X-Y coordinate plane;
    designating a reference point on said X-Y coordinate plane;
    designating two predetermined angles ($\alpha i$, $\beta i$) respectively based on an X-axis and a Y-axis around said reference point;
    rotating said X and Y components of said basic pattern data in accordance with said two predetermined angles ($\alpha i$, $\beta i$) to form a transformed pattern; and
    storing said transformed pattern so that the sewing machine can accurately and rapidly execute said transformed pattern by effecting corresponding relative movement between said stitch forming means and said material holding means.

10. The method of claim 9, wherein the reference point is designated by a light pen.

11. The method of claim 9, wherein the reference point is designated by a tablet board and a stylus.

12. The method of claim 9, wherein the reference point and the predetermined angles are designated by a key board.

13. The method of claim 9, wherein the basic pattern data includes a plurality of stitch blocks and the rotation step transforms each individual stitch block in accordance with said two predetermined angles to form the transformed pattern.

14. The method of claim 9, wherein the basic pattern data is transformed by an inclination, rotation or inversion process in a single operation.

15. A data processing device for a sewing machine having stitch forming means, material holding means and driving means for effecting the relative movement between said stitch forming means and said material holding means based upon processed pattern data, said data processing device comprising;

first storage means for storing a basic pattern data indicating the relative position between said stitch forming means and said material holding means, said basic pattern data including X and Y components of an X-Y coordinate plane;

setting means for selecting two predetermined angles ($\alpha i$, $\beta i$) respectively based on an X-axis and a Y-axis around a predetermined reference point;

transforming means for rotating said X and Y components of said basic pattern data in accordance with said two predetermined angles ($\alpha i$, $\beta i$) to form a transformed pattern; and     second storage means for storing said transformed basic pattern data.

* * * * *